United States Patent [19]

Blackman

[11] Patent Number: 5,333,033
[45] Date of Patent: Jul. 26, 1994

[54] APPARATUS FOR TRANSPORTING A FILM CARTRIDGE THROUGH A PHOTOFINISHING PROCESS

[75] Inventor: Robert J. Blackman, Rochester, N.Y.

[73] Assignee: Eastman Kodak Company, Rochester, N.Y.

[21] Appl. No.: 957,852

[22] Filed: Oct. 8, 1992

[51] Int. Cl.$^5$ ............................................. G03B 17/26
[52] U.S. Cl. ..................................... 355/27; 355/40; 355/75; 354/275
[58] Field of Search ............... 354/340, 344, 345, 346, 354/275, 21, 313; 355/27, 40, 75

[56] References Cited

U.S. PATENT DOCUMENTS

| | | | |
|---|---|---|---|
| 4,192,602 | 3/1980 | Lamoreaux, Jr. | 354/346 |
| 4,678,299 | 7/1987 | Harvey | 354/21 |
| 4,928,900 | 5/1990 | Beery | 242/71.1 |
| 5,032,707 | 7/1991 | Gudmundson et al. | 235/375 |
| 5,093,686 | 3/1992 | Shigaki | 355/77 |
| 5,229,802 | 7/1993 | Shiota et al. | 354/275 |
| 5,231,439 | 7/1993 | Takahashi et al. | 354/313 |

Primary Examiner—Richard A. Wintercorn
Assistant Examiner—D. P. Malley
Attorney, Agent, or Firm—Peter J. Bilinski

[57] ABSTRACT

An apparatus for transporting a film cartridge, having a spool end and a film ingress/egress slot, containing an exposed photographic film through a photofinishing process comprises a pallet adapted to hold the film cartridge. The pallet includes an interior opening for holding a film cartridge in fixed relation to the pallet with the spool end and the film ingress/egress slot of the film cartridge exposed to permit the spool end to be rotated to thrust the photographic film out of the film cartridge and to return the photographic film to the film cartridge.

10 Claims, 5 Drawing Sheets

APPARATUS FOR TRANSPORTING A FILM CARTRIDGE THROUGH A PHOTOFINISHING PROCESS

FIELD OF INVENTION

The present invention is generally directed to the field of photography and in particular to an apparatus for transporting a photographic film cartridge to a photofinishing process.

BACKGROUND OF THE INVENTION

The current process for handling film cartridges containing exposed photographic film in a photofinishing laboratory includes the steps of cross referencing an incoming envelope with the film which was contained in the envelope and splicing a plurality of film strips together into a large roll of generally seventy-five films prior to film processing. The roll of spliced film is then sent to a processing station to develop the film, after which the images of each frame are exposed onto photographic paper. The roll of photographic paper is then developed.

The roll of film and the roll of paper is sent to the finishing station to be cut into film strips and prints, respectively, then matched and inserted to the original envelopes. The process of inserting film strips and prints into the envelopes is generally a time consuming manual process.

An alternative method of handling film cartridges during the photofinishing process has been proposed in U.S. Pat. No. 5,093,686 issued Mar. 3, 1992. The film cartridge containing an exposed film is transported through the photofinishing process. The film is subjected to development and/or printing with one end of the film fixed to a spool of the film cartridge.

PROBLEM TO BE SOLVED BY THE INVENTION

The prior art lacks a robust technique of handling the film cartridges during the photofinishing process.

SUMMARY OF THE INVENTION

The present invention is directed to an apparatus for transporting a film cartridge, having a spool end and a film ingress/egress slot, containing an exposed photographic film through a photofinishing process comprising a pallet adapted to hold the film cartridge. The pallet includes interior means for holding a film cartridge in fixed relation to the pallet with the spool end and the film ingress/egress slot of the film cartridge exposed to permit the spool end to be rotated to thrust the photographic film out of the film cartridge and to return the photographic film to the film cartridge.

The film cartridge transporting apparatus is sturdy and provides easy access to the spool end and the ingress/egress slot of the film cartridge. Furthermore, the film cartridge transporting apparatus is easily adapted to automation.

BRIEF DESCRIPTION OF THE DRAWINGS

Other advantages of the invention will become apparent from the following description taken in connection with the accompanying drawing wherein.

DETAILED DESCRIPTION OF THE INVENTION

Figure 1:
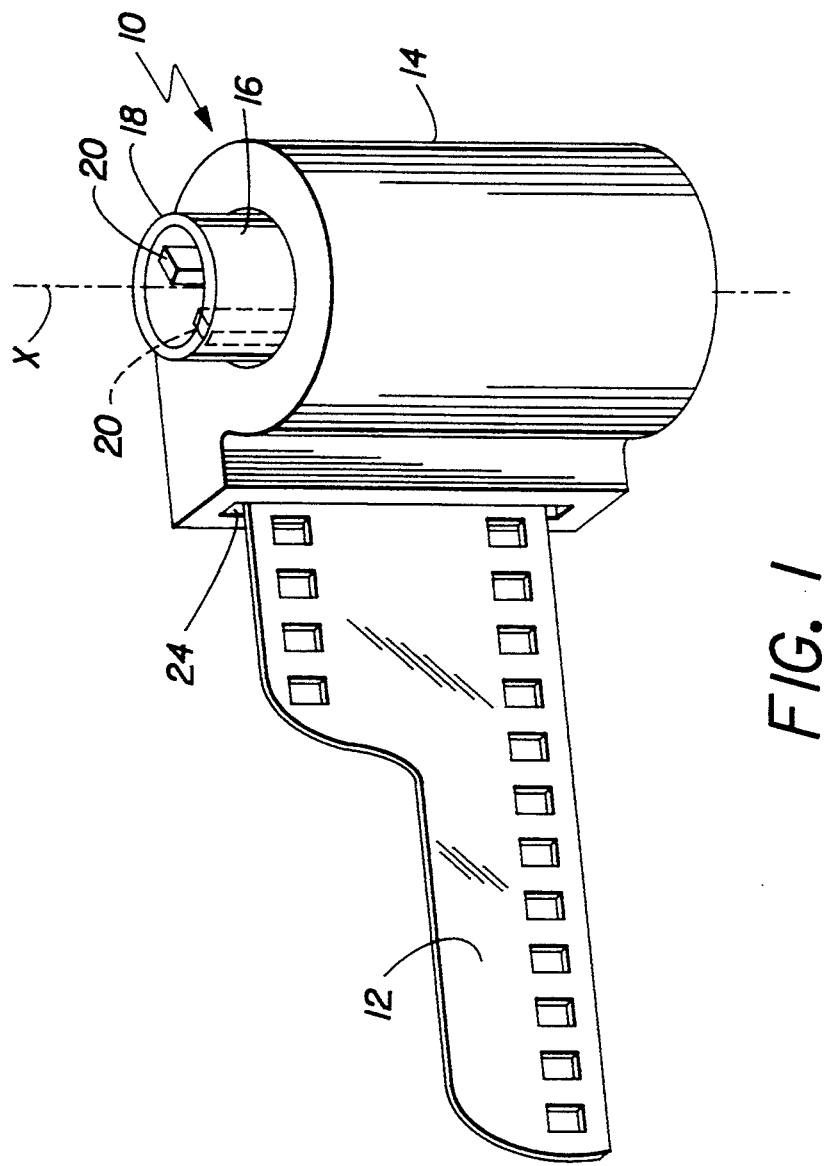
FIG. 1 is a perspective view of a film cartridge to be transported to a photofinishing process.

Referring now to the drawings, FIG. 1 depicts a film cartridge 10 containing an exposed photographic film 12. An example of such a film cartridge is disclosed in commonly assigned U.S. Pat. No. 4,834,306 by Robertson et al., the disclosure of which is hereby incorporated by reference. The film cartridge 10 comprises a light tight cassette shell 14 and a film spool 16 rotatable about an axis X within the cassette shell 14.

A spool end 18 of the film spool 16 includes a pair of keying ribs 20. The keying ribs 20 may be engaged to rotate the film spool 16 to thrust the photographic film 12 out of the film cartridge 10 and to return the photographic film 12 to the film cartridge 10 through a film ingress/egress slot 24.

Figure 2:
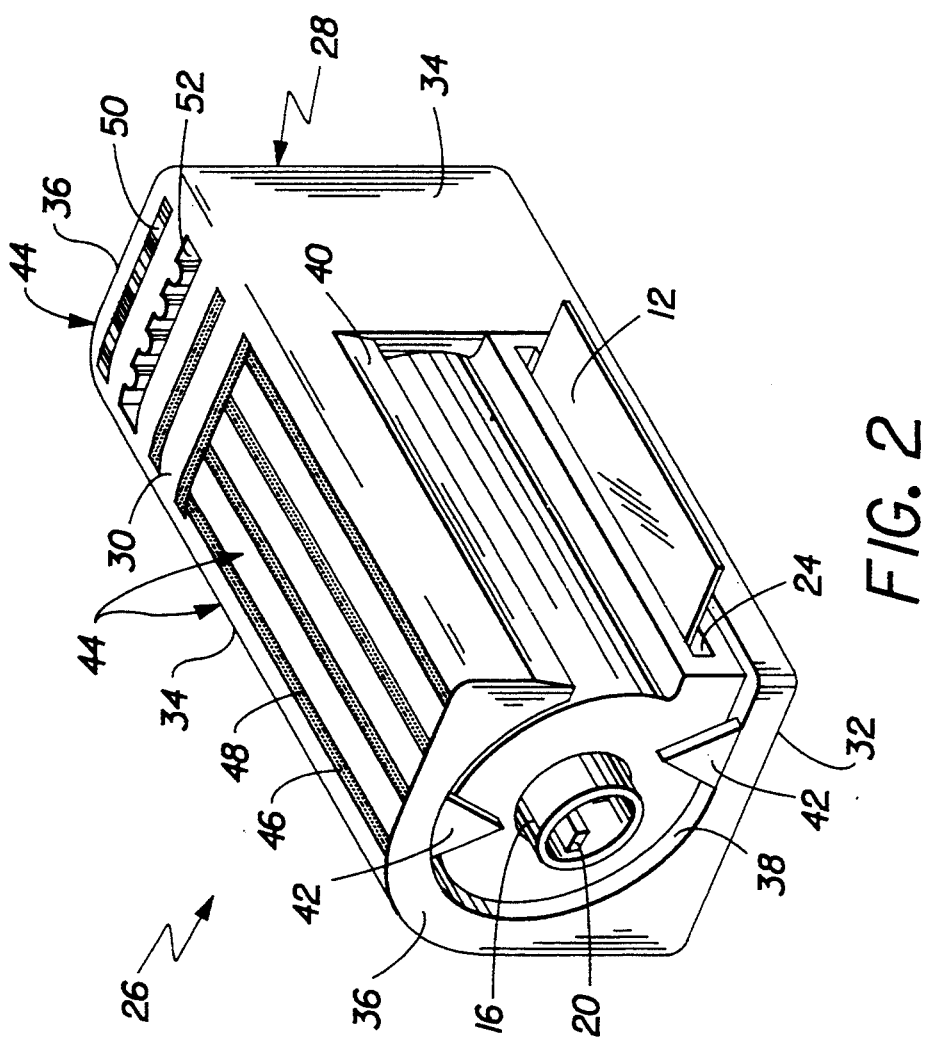
FIG. 2 is a perspective view of a pallet embodying the present invention.

A first embodiment of an apparatus 26 for transporting the film cartridge 10 containing the exposed photographic film 12 to a photofinishing process is illustrated in FIG. 2. The film cartridge transporting apparatus 26 comprises a pallet 28 having top 30, bottom 32, side 34 and end 36 portions defining interior means 38 for holding a single film cartridge 10 in a fixed relation to the pallet 28. One of the side portions 34 of the pallet 28 is open to permit the film ingress/egress slot 24 to be exposed and one of the end portions 36 is open to permit the keying ribs 20 or the spool end 18 to be engaged so that the film spool 16 can be rotated to thrust the photographic film 12 out of the film cartridge 10 and return the photographic film 12 to the film cartridge 10. The open side portion 34 includes a lip 40 to prevent rotation of the film cartridge 10. The open end portion 36 can include flexible tabs 42 to hold the film cartridge 10 within the interior means 38.

Exterior means 44 of the pallet 28 include areas 46 for storing film related data that can be read for use in the photofinishing process. The data storing areas 46 can be located on the top 30, side 34 or end 36 portions. The types of film related data can include, for example, customer name, film type, number of prints requested, dealer information, type of prints requested, etc. Some of this film related data can be read from an incoming dealer envelope containing the film cartridge 10. The photofinishing laboratory can also input film related information or information relating to the photofinishing laboratory into the data storing areas 46.

The data storing areas 46 can include magnetic strips 48 so that the film related data can be recorded magnetically on the exterior means 44 of the pallet 28. Recording film related data magnetically onto the magnetic strips 48 advantageously enables the photofinishing laboratory to record a relatively large amount of data in the data storing areas 46.

The data storing areas 46 on the exterior means 44 can include means 50 for accepting optically recorded film related data. The optically recorded data can be in the form of a barcode. The data storing areas 46 can also include means 52 for accepting mechanically recorded film related data. The mechanically recorded data can be in the form of a notch as illustrated in FIG. 2.

Figure 3:
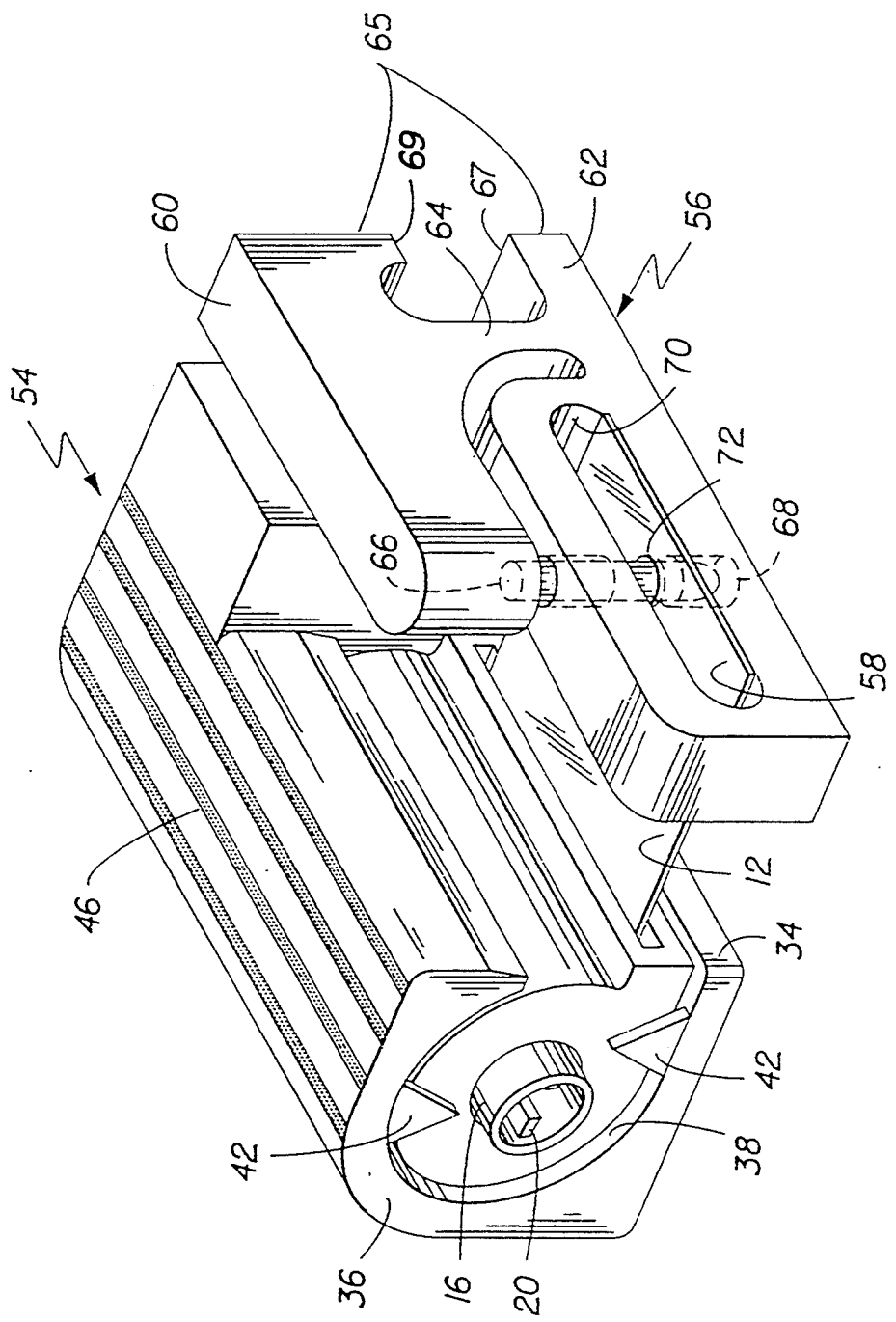
FIG. 3 is a perspective view of another embodiment of the pallet embodying the present invention.

An alternate embodiment of the pallet is illustrated in FIG. 3. In this embodiment, those components that are identical with those of the first embodiment are denoted by the same reference numerals, and a description thereof will be eliminated. A pallet 54 includes interior means 38 for holding the film cartridge 10 and areas 46 for storing film related data.

The pallet 54 further includes means 56 for clamping a leader portion 58 of the photographic film 12 to releasably hold the leader portion 58 outside the film cartridge 10 during the photofinishing process. Clamping the leader portion 58 of the photographic film 12 reduces the number of times the photographic film 12 is thrust out of the film cartridge 10 during the photofinishing process.

The clamping means 56 is located opposite and coincident to the open side portion 34 of the pallet 54 and includes a first arm 60 and a second arm 62 between which a hinge 64 is integrally formed at one end 65 of the arms 60,62. The arms 60,62 are each connected to the pallet 54 by members 67,69, respectively. The first arm 60 includes a pin 66 located at the opposite end from the hinge 64. The pin 66 fits into an opening 68 in the second arm 62. The second arm 62 further includes a slot 70 sized to permit the photographic film 12 to travel therethrough. In accordance with the present embodiment of the pallet 54, the pin 66 fits into an aperture 72 in the leader portion 58 of the photographic film 12.

Figure 4:
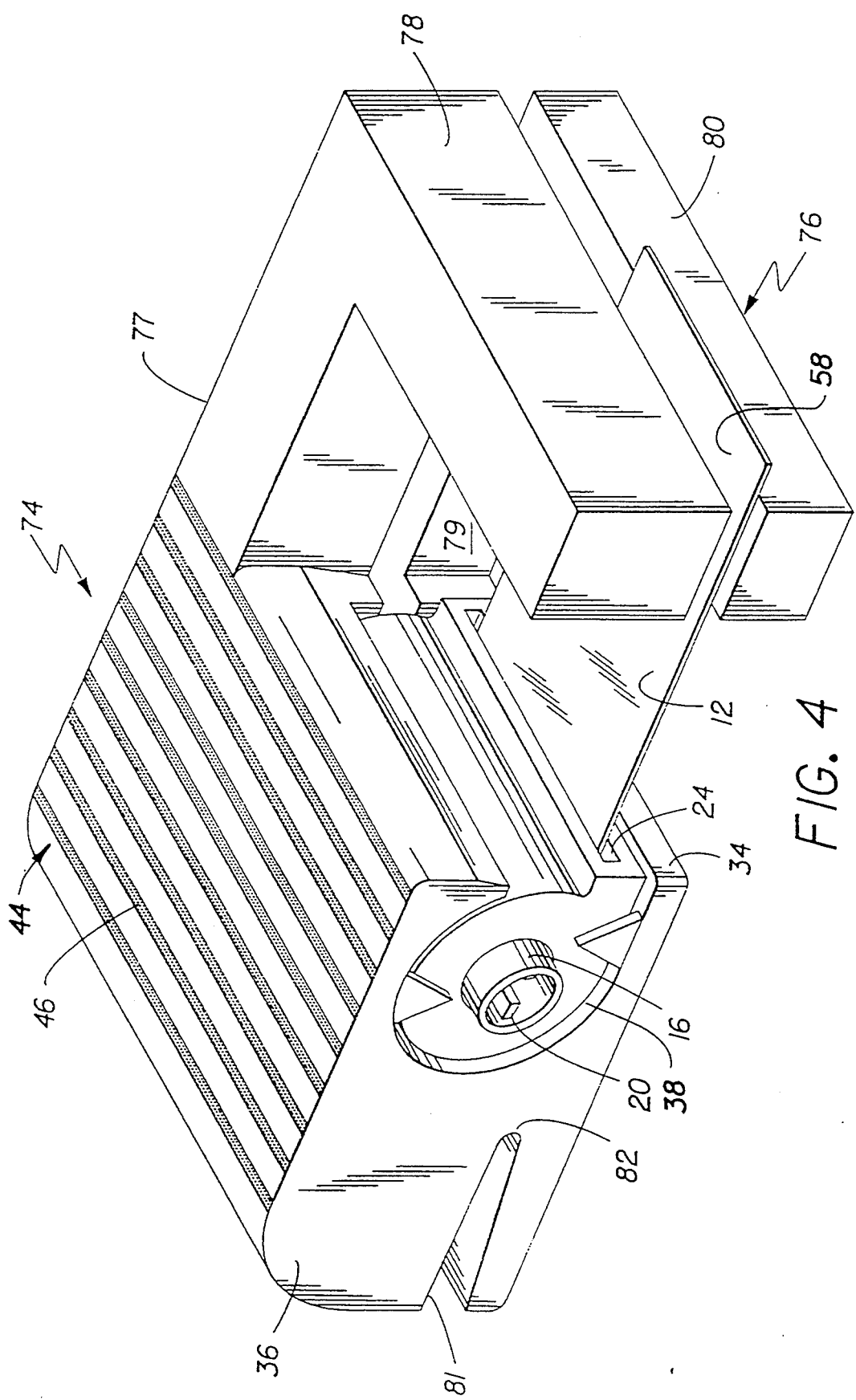
FIG. 4 is perspective view of third embodiment of the pallet embodying the present invention having clamping means in an open position.

A third embodiment of the pallet is illustrated in FIG. 4. In this embodiment, those components that are identical with those of the first embodiment are denoted by the same reference numerals, and a description thereof will be eliminated. A pallet 74 includes interior means 38 for holding the film cartridge 10 and exterior means 44 for storing film related data.

The pallet 74 further includes means 76 for clamping the film leader portion 58 with a frictional force. A first leg 77 attached to an upper portion of the open side 34 of the pallet 74 having a first member 78 perpendicular thereto and a second leg 79 attached to a lower portion of the open side 34 having a second member 80 perpendicular thereto define the friction clamp. Coincident the legs 77,79 and on the opposite the side of the interior means 38 is a C-shaped portion 81 forming a hinge 82. Pressing on the ends of the C-shaped portion 81 causes the clamping means 76 to release the film leader 58.

Figure 5:
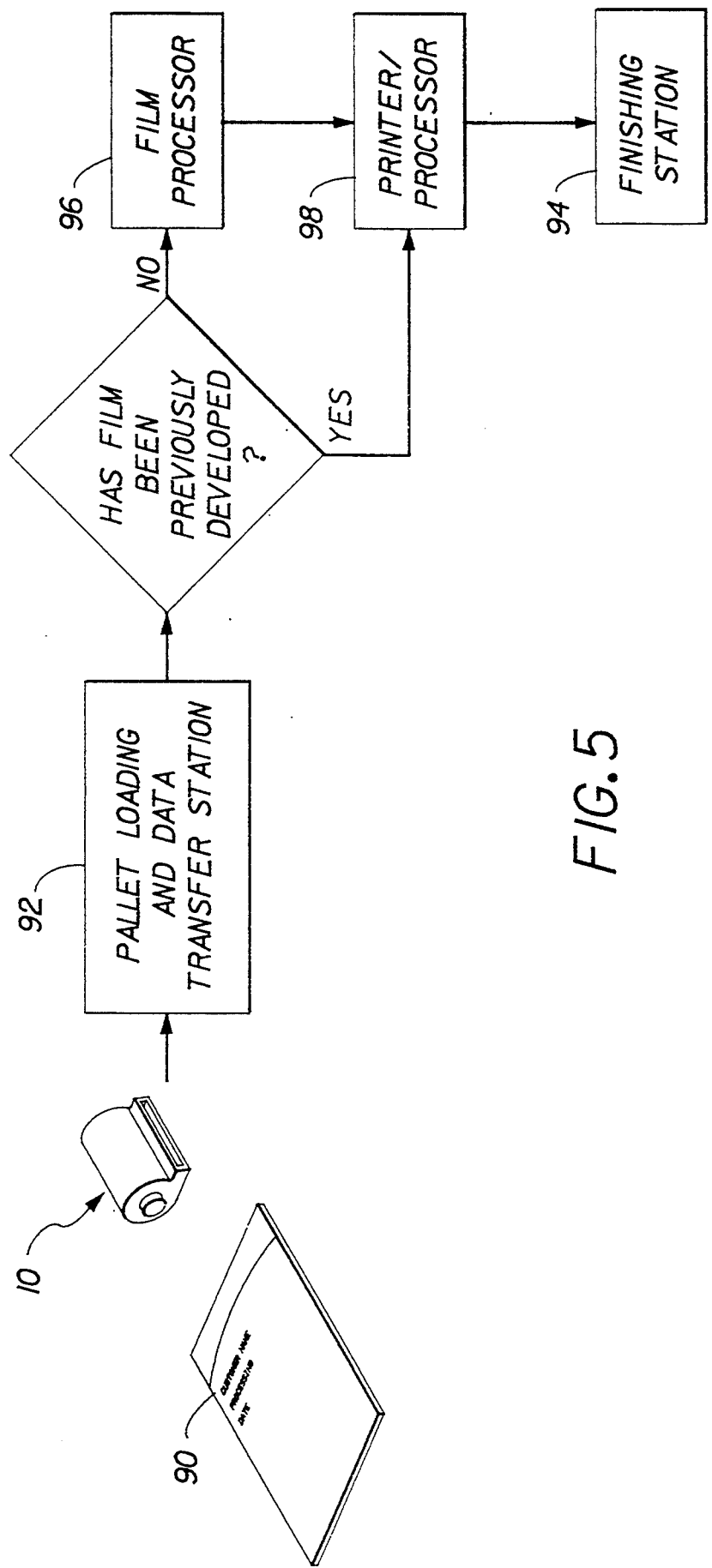
FIG. 5 is a schematic view of a photofinishing laboratory.

The operation of the pallet 28 illustrated in FIG. 2 will now be described with reference to FIG. 5. The film cartridge 10 containing exposed photographic film 12 is received by a photofinishing laboratory in an envelope 90. The envelope 90 includes customer and film related information such as customer name, dealer name, number of prints, type of prints, etc.

The film cartridge 10 and envelope 90 are transferred to a pallet loading/data transfer station 92 where the film cartridge 10 is removed from the envelope 90 and inserted into the pallet 28. The pallet loading/data transfer station 92 includes a data reader/recorder (not shown) which reads the customer and film related data from the envelope 90 and records the data onto the data storing areas 46 on the exterior of the pallet 28. The envelope 90 can then be discarded in an appropriate manner. The envelope 90 does not have to follow the film cartridge 10 to a finishing station 94 since all relevant information is stored on the pallet 28.

Additional film related data can be inputted by the photofinishing laboratory at this time.

It can be determined at this time if the exposed photographic film 12 in the film cartridge 10 has been previously developed. The pallet 28 containing the film cartridge 10 will be transferred to a film processor 96, having a data reading/recording portion (not shown) to read the film related data from the data storing areas 46, if the film related data indicates that the photographic film 12 has not been previously developed. The pallet 28 containing the film cartridge 10 will then be transferred to a printer/processor 98 where prints are made from the developed photographic film 12.

The pallet 28 will bypass the film processor 96 and be transferred to the printer/processor 98, having a data reading/recording portion (not shown), if the film related data indicates that the photographic film 12 has been previously developed and reprints or makeovers are requested. The images on the photographic film 12 will be exposed onto photographic paper and the photographic paper will be processed to form the prints.

The data reading/recording portions are provided on the film processing and printer/processor apparatuses for reading and/or recording data on the data storage areas, so that those apparatuses can perform processing in accordance with the read film related data.

The pallet 28 is sent to the finishing station 94 after the photographic paper is processed. The film cartridge 10 is removed from the pallet 28 and is packaged with the corresponding prints in a wallet or return envelope to return to the customer. The finishing station 94 can have a data reading/recording portion (not shown) so that it can automatically package the prints and film in accordance with the read film related data. The data reading/recording portion can transfer the film related data from the data storing areas 46 on the pallet 28 to the return envelope. The pallet 28 is then returned to the pallet loading/data transfer station 92 to be loaded with another film cartridge 10. Data relating to the new film cartridge will be recorded onto the data storing areas 46.

Each of the stations are provided with a thrusting mechanism (not shown) so that the photographic film 12 in the film cartridge 10 in the pallet 28 may be thrust from the film cartridge 10.

The operation of the pallet 54 illustrated in FIG. 3 will now be described. In this embodiment, those operations that are identical with those of the first embodiment will not be described in detail.

The film cartridge 10 containing exposed photographic film 12 is loaded into the pallet 54 at the pallet loading/data transfer station 92. The photographic film 12 is thrust from the film cartridge 10 and held by the clamping means 56. The clamping means 56 is opened by pressing together arms 60 and 62 at the end 65. The arms 60 and 62 pivot about the hinge 64 lifting the pin 66 so that the aperture 72 in the leader portion 58 of the photographic film 12 can be aligned with the pin 66 on the first arm 60 and the opening 68 in the second arm 62. The arms 60 and 62 are released and the pin 66 enters aperture 72 and opening 68 thus releasably holding the photographic film 12 outside the film cartridge 10. This is advantageous in that the photographic film 12 does not require thrusting from the film cartridge 10 at every station.

The data from the envelope 90 is read and recorded onto the data storing areas 46 of the exterior of the pallet 54. The pallet 54 then follows a similar operation to that of the first embodiment.

The operation of the pallet 74 illustrated in FIG. 4 will now be described. In this embodiment, those operations that are identical with those of the first embodiment will not be described in detail.

The film cartridge 10 containing exposed photographic film 12 is loaded into the pallet 74 at the pallet loading/data transfer station 92. The photographic film 12 is thrust from the film cartridge 10 so that the leader portion 58 can be held by the clamping means 76. The clamping means 76 is opened by rotating the members 78,80 about hinge 82 by pressing the ends of the C-shaped portion 81 together. The ends of the C-shaped portion 81 are released when the leader portion 58 is between the members 78,80.

The data from the envelope 90 is read and recorded onto the data storing areas 46 of the exterior of the pallet 74. The pallet 74 then follows a similar operation to that of the first embodiment.

Each of the pallets 28, 54, and 74 have features which result in the pallet being advantageously used with different types of film processors, i.e. dip and dunk type processors, sinusoidal type processors. For example, the pallet 28 can be used advantageously with a dip and dunk type film processor.

An apparatus for transporting a film cartridge to a photofinishing system has been described which is sturdy and easily adaptable to automation in a photofinishing laboratory. The apparatus includes areas for storing relatively large amounts of film related data to be used during the photofinishing process. The storage of information on the pallet eliminates the need for cross referencing the incoming envelope and the photographic film.

While the invention has been described with particular reference to a preferred embodiment, it will be understood by those skilled in the art that various changes may be made and equivalents may be substituted for elements of the preferred embodiment without departing from invention.

I claim:

1. A movably transportable pallet for transporting a film cartridge having a spool end, a film ingress/egress slot and containing a photographic film, said pallet being designed to hold and transport a film cartridge to, from and through a photofinishing process and comprising means for holding the film cartridge in a fixed relationship to said pallet and means for exposing the film ingress/egress slot and spool end of a held cartridge to permit the spool end to be rotated to thrust the photographic film out of said film cartridge and to return the photographic film to said film cartridge.

2. A pallet as claimed in claim 1 further comprising means located on the exterior of said pallet for storing film related data that can be read for use in the photofinishing process.

3. A pallet as claimed in claim 2 wherein said storing means includes a magnetic medium on which film related data may be magnetically recorded on or magnetically read from.

4. A pallet as claimed in claim 2 wherein said storing means includes an optical medium on which film related data may be optically recorded on or optically read from.

5. A pallet as claimed in claim 2 wherein said storing means includes a mechanical medium on which film related data may be mechanically recorded on or mechanically read from.

6. A pallet as claimed in claim 1, further comprising means for clamping portion of the photographic film so as to releasably hold said portion outside of a held film cartridge during the photofinishing process.

7. A pallet as claimed in claim 6 wherein said clamping means comprises a pair of legs, said legs being biased by means towards each other to create frictional contact so as to clamp the leader portion between said legs.

8. A pallet as claimed in claim 6 wherein said clamping means comprises a pin having a first end attached to said pallet, said pin being movable from a first position to a second position wherein a second end of said pin engages a surface of said leader portion in said second position so as to clamp said leader portion against a contact surface of said pallet.

9. A pallet as claimed in claim 8 wherein said pin engages an aperture of said loader portion when in said second position so as to clamp said portion against said contact surface of said pallet.

10. A movably transportable pallet for transporting a film cartridge having a spool end, a film egress/ingress slot and containing photographic film, said pallet comprising an interior portion for receiving and retaining a said film cartridge therein, a first open end to allow photographic film to be thrust out of a held film cartridge and returned to the held film cartridge and a second open end to allow a said spool end to be engaged so that the film can be thrust out of the held film cartridge.

* * * * *